US010310323B1

(12) United States Patent
Koch et al.

(10) Patent No.: US 10,310,323 B1
(45) Date of Patent: Jun. 4, 2019

(54) BRIGHT PANEL DISPLAY CLUSTER

(71) Applicant: VISTEON GLOBAL TECHNOLOGIES, INC., Van Buren Township, MI (US)

(72) Inventors: Marcus Walter Koch, Karlsruhe (DE); Philip Regez, Straubenhardt (DE); Alexandra Ledermann, Sinzheim (DE); Belinda Berns, Waldbronn (DE)

(73) Assignee: Visteon Global Technologies, INC., Van Buren Township, MI (US)

(*) Notice: Subject to any disclaimer, the term of this patent is extended or adjusted under 35 U.S.C. 154(b) by 0 days.

(21) Appl. No.: 15/894,211

(22) Filed: Feb. 12, 2018

(51) Int. Cl.
| | |
|---|---|
| *G02F 1/1335* | (2006.01) |
| *G02F 1/1368* | (2006.01) |
| *G02F 1/13357* | (2006.01) |
| *B60K 35/00* | (2006.01) |
| G02F 1/1362 | (2006.01) |
| G02F 1/1333 | (2006.01) |

(52) U.S. Cl.
CPC ........ *G02F 1/133555* (2013.01); *B60K 35/00* (2013.01); *G02F 1/1336* (2013.01); *G02F 1/1368* (2013.01); *G02F 1/133504* (2013.01); *B60K 2350/2034* (2013.01); *B60K 2350/2039* (2013.01); *B60K 2350/2056* (2013.01); *B60K 2350/2069* (2013.01); *G02F 2001/133388* (2013.01); *G02F 2001/133626* (2013.01); *G02F 2001/136222* (2013.01); *G02F 2203/66* (2013.01)

(58) Field of Classification Search
CPC ......... G02F 1/133555; G02F 1/133504; G02F 1/1336; G02F 1/1368; B60K 35/00
See application file for complete search history.

(56) References Cited

U.S. PATENT DOCUMENTS

| | | | |
|---|---|---|---|
| 6,317,037 B1* | 11/2001 | Ayres | G01C 23/00 340/459 |
| 8,878,660 B2* | 11/2014 | Konet | B60K 37/06 340/438 |
| 2006/0278155 A1* | 12/2006 | Soltendieck | B60K 37/02 116/62.4 |

* cited by examiner

*Primary Examiner* — Anne M Hines
(74) *Attorney, Agent, or Firm* — Quinn IP Law

(57) ABSTRACT

A display cluster having an active state and an inactive state includes a front cover with an outer surface facing outwardly toward a viewer and an inner surface opposite the outer surface. An active display region with a display screen to generate an image and a first backlight may be surrounded by a peripheral region including a second backlight. One or more of the backlights may illuminate with the display cluster in the active state. A partial mirror may be disposed on the inner surface of the front cover to allow the display light from the active display region to pass outwardly therethrough and to block incident light from passing therethrough. The partial mirror may prevent reflections from one or more structures located therebeyond, away from the viewer, and may thereby present a uniform appearance between the active display region and the peripheral region with the display cluster in the inactive state.

13 Claims, 4 Drawing Sheets

BRIGHT PANEL DISPLAY CLUSTER

BACKGROUND

Display clusters are frequently provided in many different types of applications, in particular those applications which require a user to receive and or to interact with a machine. Such display clusters are commonly used in vehicles to display navigation, infotainment, and other information and controls related to operation of the vehicle or other ancillary systems. Display clusters may also be used in non-vehicular applications including, for example, kiosks, automated teller machines, vending machines, etc.

Display clusters frequently include display screens located in an active display region to show graphics such as images. Display clusters also frequently include peripheral regions surrounding the active display region. Traditionally, the peripheral regions are provided with black or dark colors which help to mask the transition between the active display region and the peripheral region. Such a transition can be especially apparent when the display screen is in an inactive, or off state. For aesthetic and for practical purposes, it may be desirable to provide a display cluster that is brightly colored in white or another light or pale color. Traditional display clusters generally are unable to maintain a uniform appearance between the active display region and peripheral region, especially when the display screen is in an inactive condition and when there is bright ambient light, such as in daylight conditions. The visible transition which hinders such a uniform appearance may be caused by, for instance, inconsistent reflections between the active display region and peripheral region. There exists a need for a display cluster that is capable of displaying a bright color and which maintains a uniform appearance between an active display region and a peripheral region.

SUMMARY

A display cluster having an active state and an inactive state includes a front cover including an outer surface facing outwardly toward a viewer and an inner surface opposite the outer surface. The display cluster has an active display region including a display screen to generate an image, and a peripheral region surrounding the active display region. A partial mirror may be disposed on the inner surface of the front cover to allow the display light from the active display region to pass outwardly therethrough and to block incident light from passing therethrough. The partial mirror may prevent reflections from one or more structures located therebeyond, away from the viewer, and may thereby present a uniform appearance between the active display region and the peripheral region, particularly with the display cluster in the inactive state.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1A:
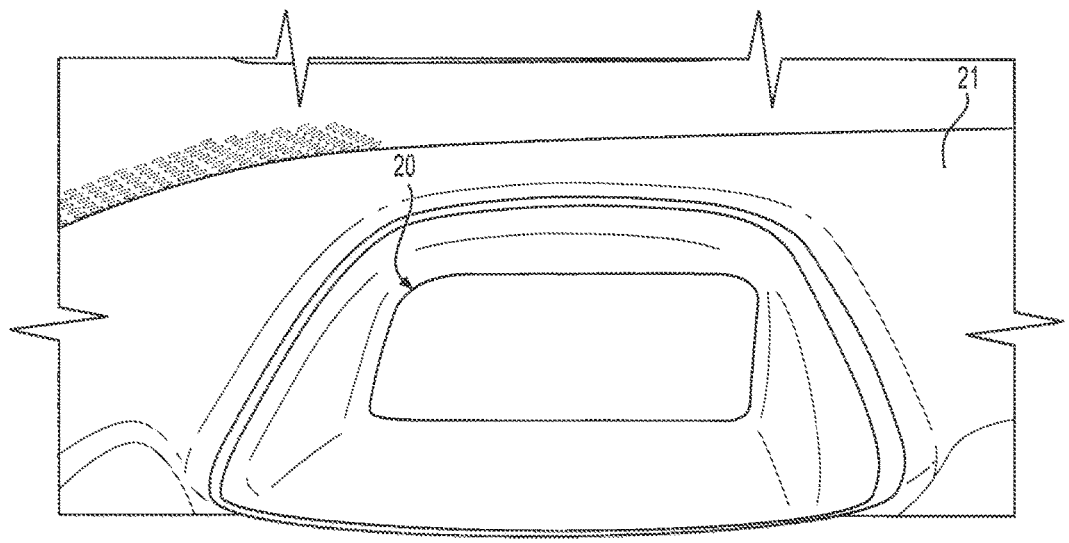
FIG. 1A is a front view of a display cluster in an inactive state.
Figure 1B:
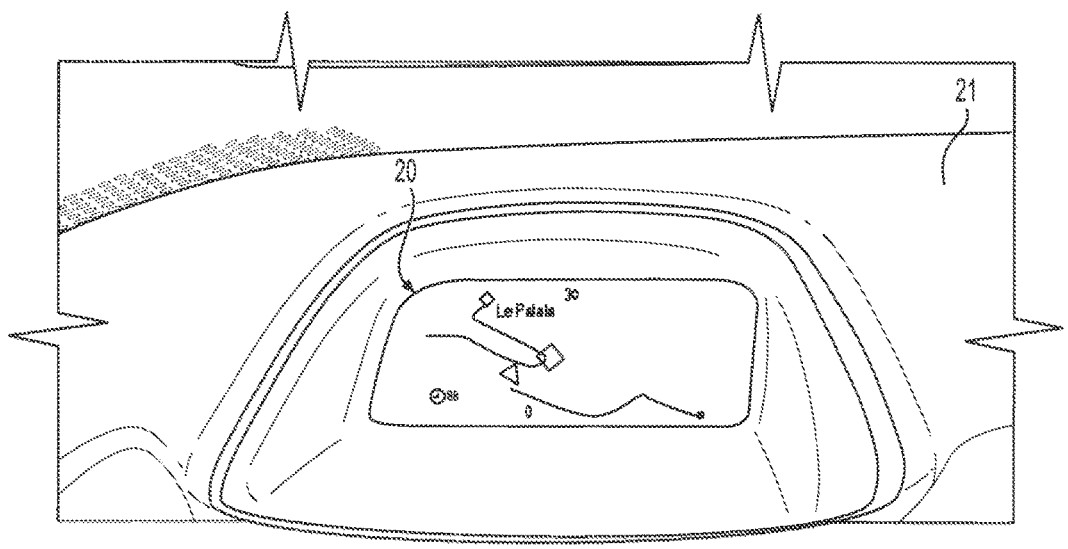
FIG. 1B is a front view of a display cluster in an active state.

Referring to the Figures, wherein like numerals indicate corresponding parts throughout the several views, a display cluster 20 for a vehicle is disclosed. As shown in FIGS. 1A-IC, the display cluster 20 may be located within the dashboard 21 of a vehicle, and may be located directly in front of a driver, however, it may be located in other positions such as in a central portion of the dashboard 21. The display cluster 20 may also be mounted in other locations such as, for example, within a center stack below the dashboard 21 and between the front seats. The display cluster 20 may be operable in an inactive or "off" state as shown in FIG. 1A and in an active state, with one or more portions being illuminated as shown in FIG. 1B.

Figure 2:
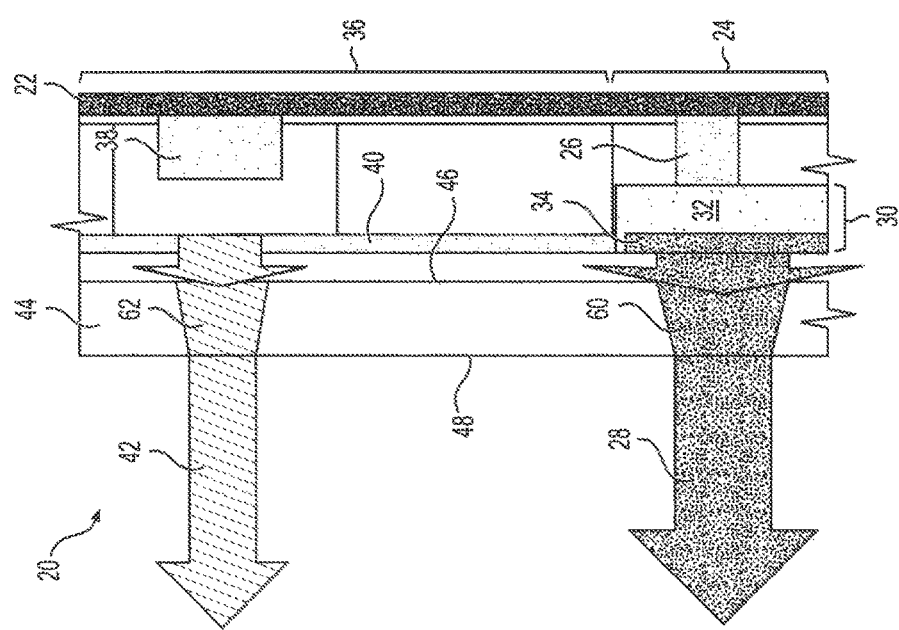
FIG. 2 is a cut-away side view of a display cluster.

As best shown in FIG. 2, the display cluster 20 may include a backing plate 22 located opposite viewer such as a driver or passenger in the vehicle. The backing plate 22 may provide structural rigidity and which may allow for mounting the display cluster 20 to the vehicle, such as for providing a rigid attachment point for a housing and/or mounting brackets or other such hardware.

The display cluster 20 may include an active display region 24 which may have a first backlight 26 to emit a display light 28 with the display cluster 20 in the active state, and a display screen 30 to generate an image. The display screen 30 may include, for example, a liquid crystal display (LCD) mounted to the backing plate 22 and having a thin film transistor 32 layer (TFT) covered by a tinted layer 34 which may appear as white or as a pale color with the display cluster 20 in the inactive state. The display cluster 20 may include one or more single-purpose graphics that are configured to always show the same content. Alternatively, the display cluster 20 may be configured as a multifunction display to show different display images depending on the mode. Such a multifunction display may, for example, display a map as is shown in FIG. 1B as well as other displays and/or controls including infotainment related items, HVAC system controls, etc.

The display cluster 20 may also include a peripheral region 36 surrounding the active display region 24 and which may have a second backlight 38 disposed upon the backing plate 22 for illuminating the peripheral region 36. A diffuser 40 of translucent material may be provided for spreading light from the second backlight 38 over the peripheral region 36 as a peripheral light 42 with the display cluster 20 in the active state. In this way, the peripheral region 36 may appear to have a uniform glow.

According to an aspect, one or more of the backlights 26, 38 may be illuminated in the active state and off in the inactive state. According to a further aspect, the display screen 30 may show display images only with the display cluster 20 in the active state.

Figure 3:
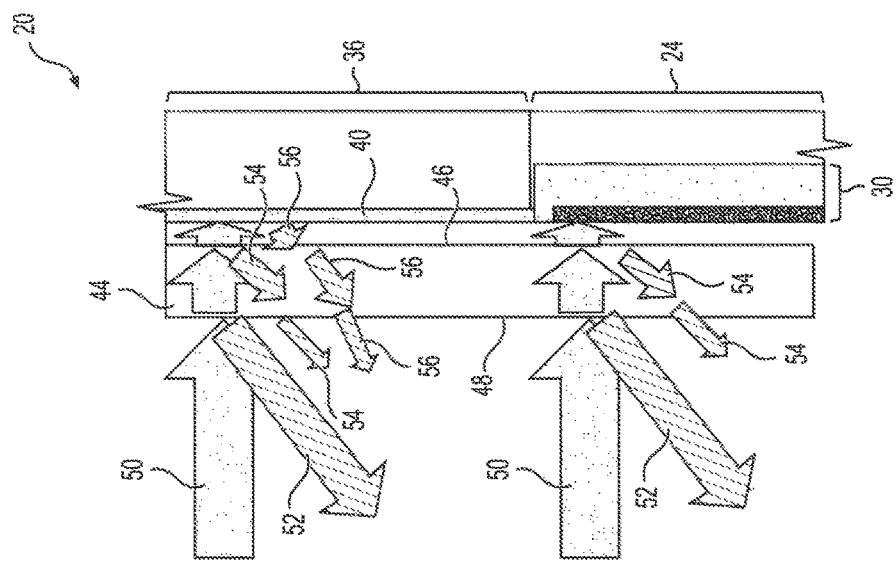
FIG. 3 is a cut-away side view of a display cluster of the prior art.
Figure 4:
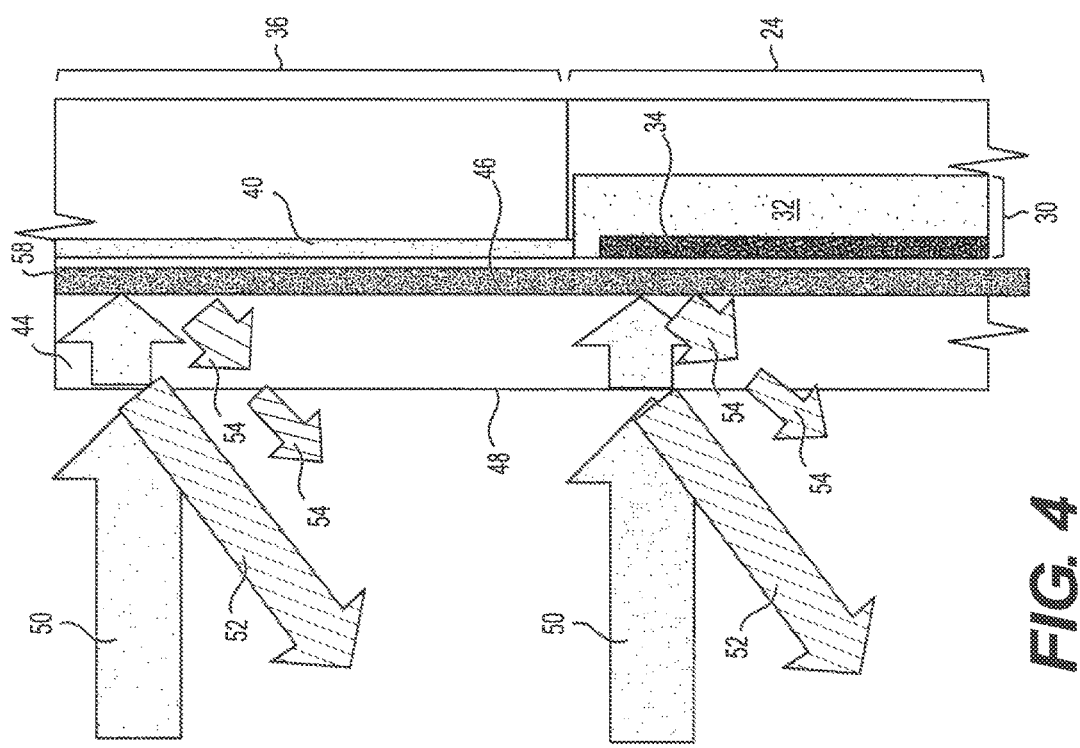
FIG. 4 is a cut-away side view of an embodiment of a display cluster in accordance with the present disclosure.

As shown in FIGS. 2-4, the display cluster 20 may further include a front cover 44, which may be a generally flat sheet of translucent material overlying the active display region 24 and the peripheral region 36. The front cover 44 may have a degree of curvature in one or two dimensions. According to an aspect, the front cover 44 may be translucent and/or tinted to provide a uniform coloration over the display cluster 20 between the active display region 24 and the peripheral region 36. The front cover 44 may appear to be white or light-colored such as a pastel or a pale color. More specifically, the front cover 44 may have a color intensity that is below a predetermined value. The front cover 44 may include an inner surface 46 facing the backing plate 22 and an outer surface 48 opposite the inner surface 46. In other words, the outer surface 48 may face outwardly closest to the viewer, and the inner surface 46 may face inwardly toward the internal components of the display cluster 20.

Figure 1C:
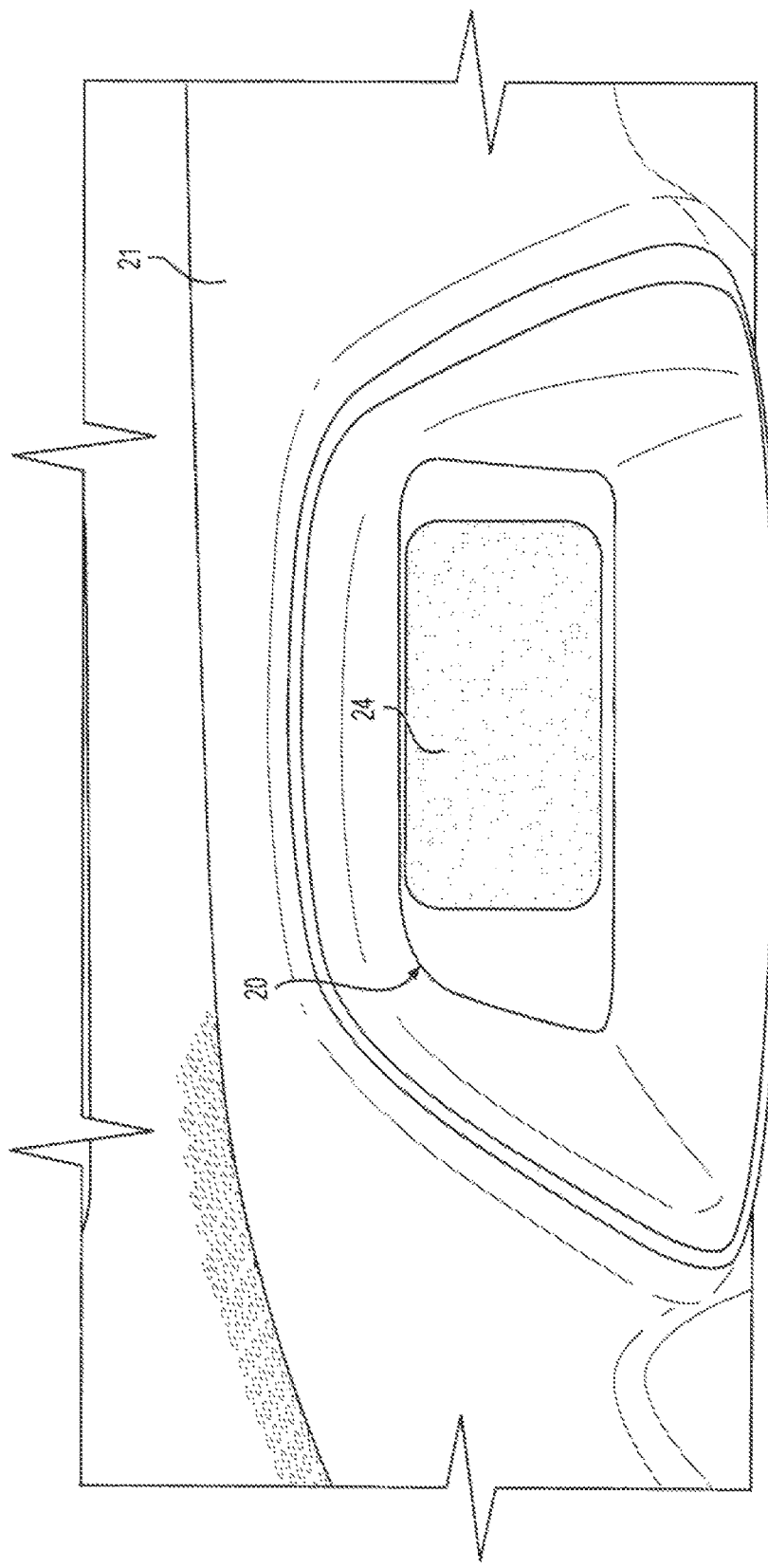
FIG. 1C is a front view of a display cluster of the prior art in an inactive state.

As illustrated in FIG. 3, the outer surface 48 of the front cover 44 may reflect incident light 50 from environmental sources (i.e. sources outside of the display cluster 20) to cause a first reflected light 52. Likewise, the inner surface 46 of the front cover 44 may reflect the incident light 50 to cause a second reflected light 54. Furthermore, the diffuser 40 may reflect the incident light 50 to cause a third reflected light 56, which may be non-uniform which may appear as a non-uniformity between the active display region 24 and the peripheral region 36. For example, as illustrated in FIG. 1C, the third reflected light 56 may cause the peripheral region 36 to appear relatively brighter when compared to the dimmer active display region 24.

As illustrated in FIG. 4, and in accordance with the present invention, a partial mirror layer 58 may be disposed on the inner surface 46 of the front cover 44 for allowing the display light 28 from the active display region 24 to pass outwardly therethrough while also blocking the incident light 50 from passing therethrough and to prevent the incident light 50 from reflecting back outwardly. In particular, the partial mirror layer 58 may prevent the third reflected light 56 from reflecting from the diffuser 40, which may thereby provide for a more uniform appearance between the active display region 24 and the peripheral region 36, in particular with the display cluster 20 in the inactive state.

The partial mirror layer 58 may be formed on the inner surface 46 of the front cover 44 by vapor deposition. According to an aspect, the partial mirror layer 58 may be formed of metal, which may include aluminum. The partial mirror layer 58 may be a multilayer dielectric coating having a plurality of layers of dielectric material. Such a construction may also be called a partial dielectric mirror. The partial mirror layer 58 may also take the form as a separate layer that formed independently from the front cover 44, and which may be attached thereto using, for example, a liquid optically clear adhesive (LOCA).

According to an aspect, and as illustrated in FIG. 2, an effect of the front cover 44 being tinted may cause the display light 28 to be reduced in brightness along a first dimming region 60. Likewise, the peripheral light 42 may also be reduced in brightness along a second dimming region 62. The addition of the partial mirror layer 58 may allow for the front cover 44 to be provided with a lower level of tint and/or opacity while still allowing for a uniform appearance between the active display region 24 and the peripheral region 36. As such, the reduction in brightness in the dimming regions 60, 62 may be reduced or eliminated.

According to an aspect, the system may include an "electrochromic window" in which the display screen 30, or the front cover 44, or a portion of either of those layers is configured to be electronically switched between a high transparency mode and a low transparency mode, which may also be called an opaque mode.

According to an aspect, optical bonding, such as a liquid optically clear adhesive (LOCA) may be used in the display cluster 20 such as, for example, between the display screen 30 and the front cover 44.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A display cluster having an active state and an inactive state and comprising:
    a front cover including an outer surface facing outwardly toward a viewer and an inner surface opposite the outer surface;
    an active display region including a display screen to generate an image;
    a peripheral region surrounding the active display region;
    a partial mirror layer disposed on the inner surface of the front cover to allow the display light from the active display region to pass outwardly therethrough and to block incident light from passing therethrough to prevent reflections from therebeyond and thereby presenting a uniform appearance between the active display region and the peripheral region with the display cluster in the inactive state.

2. The display cluster as set forth in claim 1 wherein the peripheral region has a pale color having a color intensity below a predetermined value.

3. The display cluster as set forth in claim 2 wherein the peripheral region is white in color.

4. The display cluster as set forth in claim 1 wherein the partial mirror layer is comprised of metal.

5. The display cluster as set forth in claim 4 wherein the partial mirror layer includes aluminum.

6. The display cluster as set forth in claim 1 wherein the partial mirror layer is a multilayer dielectric coating having a plurality of layers of dielectric material.

7. The display cluster as set forth in claim 1 wherein the partial mirror layer is formed on the inner surface of the front cover by vapor deposition.

8. The display cluster as set forth in claim 1 further including a tinted layer covering the display screen and appearing as a light color with the display cluster in the inactive state.

9. The display cluster as set forth in claim 1 further including a first backlight within the active display region and disposed below the front cover opposite the outer surface to emit a display light with the display cluster in the active state.

10. The display cluster as set forth in claim 1 further including a second backlight disposed in the peripheral region below the front cover opposite the outer surface for illuminating the peripheral region.

11. The display cluster as set forth in claim 10 further including a diffuser of translucent material for spreading light from the second backlight over the peripheral region as a peripheral light with the display cluster in the active state.

12. The display cluster as set forth in claim 1 wherein the front cover is made of translucent material to provide with a uniform coloration over the display cluster.

13. A display cluster for a vehicle and having an active state and an inactive state and comprising:
    a backing plate for providing structural rigidity and for mounting the display cluster to the vehicle;
    an active display region including a first backlight to emit a display light with the display cluster in the active state, and a display screen to generate an image and including a liquid crystal display (LCD) mounted to the backing plate and having a thin film transistor layer (TFT) covered by a tinted layer and appearing as a light color with the display cluster in the inactive state;
a peripheral region surrounding the active display region and including a second backlight disposed upon the backing plate for illuminating the peripheral region and a diffuser of translucent material for spreading light from the second backlight over the peripheral region as a peripheral light with the display cluster in the active state;
a front cover being a generally flat sheet of translucent material overlying the active display region and the peripheral region to provide with a uniform coloration over the display cluster which may be white or a bright color, and with the front cover including an inner surface facing the backing plate and an outer surface opposite the inner surface;
wherein the outer surface of the front cover reflects incident light from environmental sources to cause a first reflected light;
wherein the inner surface of the front cover reflects the incident light to cause a second reflected light;
wherein the diffuser reflects the incident light to cause a third reflected light causing a non-uniformity between the active display region and the peripheral region;
a partial mirror layer of metal disposed on the inner surface of the front cover for allowing the display light from the active display region to pass outwardly therethrough while also blocking the incident light from passing therethrough to prevent the incident light from reflecting outwardly from therebeyond including from the diffuser and thereby presenting a uniform appearance between the active display region and the peripheral region with the display cluster in the inactive state;
wherein the partial mirror layer includes aluminum;
wherein the partial mirror layer is formed on the inner surface of the front cover by vapor deposition;
wherein the front cover causes the display light to be reduced in brightness along a first dimming region;
wherein the front cover causes the peripheral light to be reduced in brightness along a second dimming region.

* * * * *